US008655378B1

(12) United States Patent
Crossno et al.

(10) Patent No.: US 8,655,378 B1
(45) Date of Patent: Feb. 18, 2014

(54) METHOD AND APPARATUS FOR TRACKING A TRANSPORTED ITEM WHILE ACCOMMODATING COMMUNICATION GAPS

(71) Applicants: Adam Crossno, Flower Mound, TX (US); Bruce C. Lutz, Plano, TX (US)

(72) Inventors: Adam Crossno, Flower Mound, TX (US); Bruce C. Lutz, Plano, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 0 days.

(21) Appl. No.: 13/664,141

(22) Filed: Oct. 30, 2012

(51) Int. Cl.
*H04W 4/00* (2009.01)

(52) U.S. Cl.
USPC ..................... 455/456.1; 455/456.6

(58) Field of Classification Search
USPC ................ 455/404.2, 418, 414.2, 440, 456.1, 455/456.2, 456.3, 456.4, 456.5, 456.6, 457, 455/344, 426.1, 436, 552.1; 379/25, 62, 379/142.1, 207.12; 701/45, 46, 409, 418, 701/433, 450, 117; 340/539.13, 815.4, 340/815.45, 815.67
See application file for complete search history.

(56) References Cited

U.S. PATENT DOCUMENTS

| | | | | |
|---|---|---|---|---|
| 2004/0186623 | A1* | 9/2004 | Dooley et al. | 700/245 |
| 2005/0134440 | A1* | 6/2005 | Breed | 340/435 |
| 2007/0173266 | A1* | 7/2007 | Barnes | 455/456.1 |
| 2010/0113061 | A1* | 5/2010 | Holcman | 455/456.1 |

* cited by examiner

*Primary Examiner* — Inder Mehra
(74) *Attorney, Agent, or Firm* — Bruce C. Lutz

(57) ABSTRACT

A method and apparatus is provided for minimizing potential security problems and battery power usage in a tracking device used in tracking an associated product while being transported along a route wherein wireless communication may be nonexistent or intermittent. This is accomplished in part by having an accessible database of signal quality and strength at a large plurality of locations along given transportation routes whereby adjustments can be made as to the times for the tracking device to obtain GPS location information as well as for times to report any location and or product status data to a remotely located central station. The ability to predict when, along a transportation route communication problems may occur provides the opportunity to notify appropriate authorities in advance of arriving at the communication gap zones whereby arrangements can be made to alleviate potential problems during transportation through wireless communication "gap or dead" zones.

7 Claims, 6 Drawing Sheets

METHOD AND APPARATUS FOR TRACKING A TRANSPORTED ITEM WHILE ACCOMMODATING COMMUNICATION GAPS

FIELD OF THE INVENTION

The present invention relates generally to location determining and more particularly to wireless tracking devices and their communication with a remote receiving and/or monitoring device, such as a central station, while being transported between a starting point A and a destination B along a route which may contain at least primary communication gaps as well as total blackout of wireless communication. Techniques and procedures are disclosed for accommodating situations arising because of the gaps and for predicting non-communication susceptibility to the communication coverage gaps.

BACKGROUND

It is becoming increasingly common to associate an active wireless tracking device with a product, person, or other animal to monitor that entities' location while the entity is proceeding from one point to another. The location of the device and any sensed data can be communicated directly to a person associated with the tracking device as well as to an appropriate authority via wireless circuitry unless the device is in an area where communication with a wireless network is difficult or non-existent due to obstructions, distance from a network transceiver or other contributing factors.

This process is especially important in connection with products and associated tracking devices that are being transported from a source to a given destination in view of increased theft activity involving containerized goods. Some of the more advanced tracking devices include sensors for additionally monitoring status of the product with which it is associated. In other words, the temperature, the shock events to which the device is subjected, and so forth can be monitored and the data may either be stored or communicated to an appropriate authority for whatever action may be necessary or otherwise appropriate. Typically the tracking device and its associated product are placed in some type of enclosed container for transportation. The enclosed container will normally modify the communication characteristics between the tracking device and the wireless network(s) as compared to non-containerized tracking devices typically used for communication with those same networks. In other words, there is more likely to be gaps in communication between a containerized wireless communication device and the wireless network(s) than would be the case if the wireless device were not in a transportation container.

As will be apparent, when a tracking device is in a transportation container, the placement in the transportation container, in other words, whether it's in the middle of the transportation container or next to an outside wall of the transportation container, will affect the strength of any signal received by a wireless network. Likewise, if the tracking device is near the center of a transportation container, other products nearby may, at times, depending upon the material of the product, substantially interfere with any transmission from the tracking device to a wireless network.

Further, there are often problems communicating with wireless networks in mountainous areas or where there may be a sparsity of patrons that would be likely to use the wireless service, such as a route through the desert. Also, while tunnels through mountains or under rivers can include the capability of wireless communication, wireless communication is completely absent in many older tunnels. Even in urban areas, there are wireless signal gaps sometimes referred to as urban wireless canyons.

When a wireless device attempts a communication, more battery power is utilized than when the device is merely sitting idle awaiting a future action to be taken. A wireless tracking device periodically attempts to determine location from communicating with a set of GPS satellites, network tower positioning (location determining) data, internally located accelerometers, and so forth. When a location is determined, whether obtained from received data or guesstimated by the device, the device typically will attempt to at least periodically transmit data such as at least the last determined location to a remote receiver such as a central station. The device cannot communicate with GPS type satellites in a tunnel and often times cannot communicate with either GPS type satellites or ground wireless network infrastructure in certain mountainous areas or urban canyons.

When a system is programmed such that a tracking device is scheduled to report at prescribed intervals as to its location and maybe even status of a product being monitored and a central station does not receive a report at the scheduled time, such a lack of report may well be interpreted as a problem such as theft, breakdown of the tracking device and so forth.

It would thus be desirable to find a method of preventing activation of the communication capabilities of the wireless tracking device when there is little likelihood of being able to complete an intended communication and thus wasting battery power and thereby shortening the life of available data transfer capability of the device before reaching a given destination.

It would also be desirable to have the tracking device be able to automatically notify or arrange to notify appropriate authorities in advance of entering an area having a known history of unreliable communication so that the authority notified may take additional steps to monitor the situation where deemed appropriate by that notified authority. Additionally, upon entering an area of unreliable communication, it would be desirable in some instances for the tracking device to alter its actions or responses to sensed conditions.

Further, it would be even more desirable to be able to predict when a transportation container having a given tracking device is in a communication gap whereby an alarm notification is not generated merely because a report is not received from the tracking device at exactly a scheduled time. Likewise, it would be desirable to be able to advise a transportation vehicle operator in advance to use alternate means of reporting to someone since the vehicle will soon be in a communication gap.

In addition, it would be desirable to be able to advise any entities monitoring a given device of the likelihood of an impending coverage gap to avoid the misinterpretation of lack of expected data triggering the calling of appropriate authorities to be dispatched to the area. In a similar manner, where the tracking device is associated with an individual, it may be appropriate to notify the individual of a potential forthcoming communication problem if continuing in the same direction whereby the individual may be able to choose a different route to alleviate the potential lack of communication problem.

It would also be desirable to be able to advise owners of products being tracked of the existence of transportation routes that do not have communication gaps even though travel through these alternate routes may be longer or slower whereby the owners may be afforded the opportunity to factor safety and the increased percentage of wireless coverage into their transportation route decisions.

Likewise, it would be desirable to have the capability to "rank" a given transportation route, according to both the actual and predicted coverage gaps based on the real-time and/or historical information gathered from an installed tracking device or other RF communicating apparatus, to enable an entity with the ability to change the intended route dynamically in response to such information. This capability is especially desirable where the type of coverage (2G, 3G, 4G, LTE, Local Area Network (LAN), satellite, and so forth) is an important part of the determination and factors considered in the decision.

SUMMARY

The present invention collects and stores communication data from various sources, including data distributed by cell phone and satellite type network carriers. This data includes signal strength and other characteristics of completed communication events as well as data relating to communication problem areas including communication gaps and intermittent reception.

Additional data may be obtained in a manner similar to various prior art methods such as a Hebron U.S. Publication No. 2003/0224806 which was abandoned in April 2009. Since the communication characteristics will be different for different types of transportation containers, it is desirable, but not required, that a separate set of data be collected for each type of transportation container that may be used in transporting goods for a product associated with a given wireless tracking device as used in this invention in situations where predetermined transportation routes are being used.

By making such data available to any portable wireless device that accesses network communication sites while moving, such as a wireless tracking device, appropriate programming in the electronic device may then be utilized to not waste battery power in attempting to communicate in an actual or predicted dead zone where either satellites or the nearest available communication towers are not likely to provide wireless access. As will be apparent, the programming can alternately be in a central station and the wireless tracking device can merely be fed such information enough in advance to allow it to function as if the entire program were in the tracking device.

The capability of prediction of communication problems if continuing in the same direction or along a preplanned route permits warning appropriate parties whereby a different action or route may be taken in an attempt to prevent communication interruption.

Such information is also useful in minimizing the likelihood of an inaccurate transportation problem notification to appropriate authorities in situations where, prior to the present invention, the central unit is not aware of a communication gap and reports to authorities that the lack of receipt of a scheduled communication might be because the trailer was hijacked and the wireless tracking device destroyed.

Although, as noted above, it is preferable to have a separate communication database for each type of transportation container, with appropriate calibration techniques, a database generated for one type of container can be used for a new container, with acceptable initial use accuracy, by modifying the values used in a gap determining algorithm in accordance with calibration ascertained data.

The information and data collected may be used by the system to generate displays or other presentations indicating relative safety of transportation routes as a function of communication reliability along the routes. These displays and other presentations may then be used by an entity wishing to have goods transported between a starting point A and a destination B to assist a determination as to how the transportation is to take place.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

Figure 1:
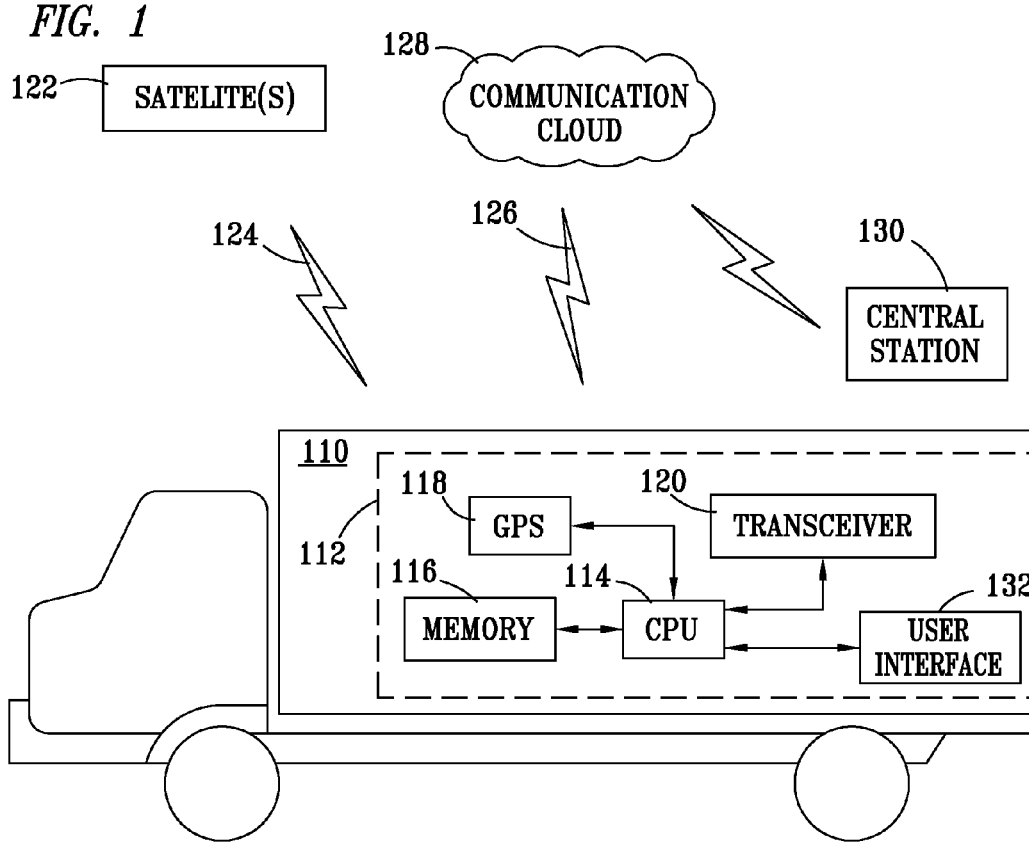
FIG. 1 is illustrative of at least one tracking device in a transportation container that is collecting location data from one or more satellites and reporting to a central station any appropriate information such as location as well as product status that may be sensed by the tracking device.

The present invention is described herein primarily as applied to tracking devices associated with goods enclosed in transportation containers that move goods on highways. The tracking device, as used in some variations of this invention, may also be described as a smart RFID tag. In the RFID tag industry, a normal RFID tag is responsive to a reader whereas a smart RFID tag includes some kind of computing power whereby it can do more than just respond to a reader. In other words, smart tags may respond only to readers of a certain type, at a certain location or only other specified other parameters. Further, smart tags may include sensors and storage means for storing sensed data to be provided to readers at some later date.

The system as shown is readily adaptable for use in conjunction with any mode of transportation including airplanes, railroad cars, ships, and so forth. While the explanation of operation concentrates on well-known satellite and cell phone tower type communications, the concept presented is readily adaptable to any other wireless technology instead of or in addition to satellite and cell phone tower type wireless communications and specifically including wide area and local area wireless technologies. Wireless tracking and/or monitoring devices referenced hereinafter operate in a manner substantially identical with a cell phone, tablet, computer and other wireless devices using wireless telephone transmission capability for communication with other devices and are intended to be included when the terms "cell phone type device" or mobile wireless communication type devices are utilized in the specification or claims.

To most effectively utilize the present invention, it is first desirable, as mentioned above, to collect communication data from within a container substantially identical to what would be typically used when a tracking device is associated with a product during transportation along a given route. While others, such as presented in the previously mentioned Hebron application, have checked for signal quality along given highway routes, they have not been concerned with obtaining sufficiently complete data for use in connection with communication from within specific types of containers whereby communication problems may be anticipated and corrective solutions devised by appropriate software comprising a part of electronic hardware such as a tracking and/or monitoring device. In other words, if a tracking device notes that the container is approaching an area of intermittent reception that will extend over an excessive time (i.e., distance or predefined locations) period, it may decide, or be instructed, to provide a report to the central station or any other appropriate authority, such as the driver of the transporting vehicle, slightly before the area of intermittent reception. If a smart cell phone, tablet or other similar device is downloading a message or other document and notes the above mentioned area of intermittent reception being approached, a message may be provided to the operator of the device to that effect so that the operator could pull over and stop the vehicle until the downloaded message or document has been completely received. By making a report ahead of a prescheduled time (or location), the subsequent scheduled time (or location) of reporting may well occur at a time (or location) when intermittent reception is no longer a problem in the instances when the central station is programmed to expect a new report X minutes after the last received report. Although the description from now on will primarily use time in referencing time between reports and time duration of gaps and so forth, the software can alternatively or in addition use predetermined locations or distance rather than time in calculations and notifications. As is well known, where reception is intermittent, it typically takes longer to complete a communication of data than where the signal is strong and the longer time for the communication uses more battery power—therefore it may be preferable from a battery conservation point of view to attempt communication before a normally scheduled interval in situations where a zone of intermittent coverage is being approached. The same solution of a report being made before the normal time may be used by the tracking device when the tracking device ascertains that an upcoming portion of the transportation route has no reception. The decision by the tracking device to obtain GPS type location data may follow a similar pattern. The database for GPS satellite reception would be similar to but different from the database for cell phone tower reception. Alternatively, databases may be included for satellite signal reception as well as where Wi-Fi communication is likely to be available in instances where the product associated with the tracking device is of sufficient value or other importance to justify using any available alternative wireless communication avenue.

While transceivers have been used in the past to scan the frequency spectrum and intelligently select a communication frequency with which to communicate with other devices based on signal strength and other factors using hardware circuitry, this capability is enhanced by present day transceiver technology that is readily able to implement software based devices that can interact with other wireless devices having widely varying frequency and encoding techniques to perform selection process mentioned supra. Such transceivers, as made by Qualcomm and others are presently known by the acronym SDR (Software Defined Radios). It will thus be apparent to one skilled in the art that when using SDRs, the present invention may dynamically select which radio or wireless networks to utilize when attempting to accomplish a given job function.

Another advantage of having knowledge of communication problem areas along a given route allows a determination to be made at the time the tracking device is installed or otherwise included with the shipment, so that the user may be notified in real time, prior to the shipment leaving, that the device is installed in a manner that could yield undesired exposure to communication coverage issues. Thus the user can be enabled to take action to improve the situation before the shipment departs to a given destination.

While other corrective solutions to communication gaps have been considered, such as altering the packaging of the product or placement of the product within the container itself, these solutions are typically not economically feasible or practical for anything other than potentially dealing with slightly intermittent communication as opposed to communication gaps. In situations where sufficient data has been collected along a given route, it is possible to compare historical signal strength gap information to real time information and make inferred determinations of possible coverage issues even if the container, packaging or tracking device positioning is different. In other words, an absolute determination of signal strength levels, regardless of container or packaging variables, may also be useful in evaluating the likelihood of exposure to coverage gaps even when such variables cannot be appropriately recorded or controlled. For example, if a database contained historical signal strength information for a shipment transported along the same route as the current shipment, but not necessarily in the same type of container and/or packaging, and the signal strength recorded upon loading and packing of the current shipment is designated "A", then by comparison to the historical shipment (with signal strength recorded upon loading designated "B", regardless of container and/or packaging), a subtraction of the delta value between A and B may be applied to all previously recorded signal strengths along the route to indicate areas of likely exposure to communication gaps along the route for the current shipment.

While data collected from within a container during a single transportation cycle is very useful in anticipating future communication problems, data collected while placed in various positions within the container and with various other packages in the container is naturally more useful. Additionally, it is useful to obtain data collected while traveling at various times of the day and various days of the week whereby information may be collected as to typical speeds of transportation on a given route as well as potential variations in time to complete a data transfer message due to the number of cell phone users accessing available cell phone towers. As will be realized, when data is collected over time for a given route and/or product type, greater accuracy can be obtained in prediction and therefore the system may be appropriately referred to as "learning" preferred configurations for supporting and deploying wireless equipment in a given trade lane. Further, when traveling a previously mapped route for which communication data has been collected, the tracking unit can make an attempt to communicate within the area previously deemed as either no communication or intermittent communication to learn if adjustments have been made to cell phone communication towers, repeaters, transceivers or antennas to modify or eliminate communication problems. It has been found that the numbers of communication attempts required before communication initialization is completed is directly indicative of the likelihood of communication problems regardless of measured or indicated signal strength at a given site. Thus, the present invention, as a system, can continuously adapt to changing technology, repairs, upgrades to wireless network infrastructure, and so forth in a dynamic manner whereby the database for any given route may always be up-to-date.

Navigation devices mounted in a vehicle are typically not concerned with saving battery power and thus typically maintain communication with whatever source is providing location data. However, when such a navigation device is used as a portable and carried recreation or sporting accessory, battery power usage is a concern. Depending upon how often a location indication is required, it may be desirable to initiate a new communication location request each time such location data is desired rather than maintaining communication with a location providing source.

Referring now to FIG. 1, it will be noted that a transportation container 110, comprising a portion of a highway vehicle like a truck, will have, shown as part of its contents, at least one tracking device 112. The tracking device 112 is illustrated as including a CPU 114 connected to communicate with a storage device or memory 116, a GPS receiver 118 and a cell tower communication transceiver 120. The tracking device may well have sensors (not specifically illustrated) for monitoring the status of any associated goods and would also have other circuitry such as a power supply in the form of batteries. The tracking device 112 may also have further transceivers for Wi-Fi, satellite or other forms of communication or, alternatively, the transceiver 120 may be in the form of an SDR, as referenced above, designed to operate in various communication modes simultaneously or serially. Since these additional components are well known, it is believed unnecessary to further complicate the drawing by illustrating same herein. The GPS receiver 118 receives signals from satellites represented by a block 122 via a communication channel 124 while the transceiver 120 communicates via one or more communication channels 126 through a communication cloud 128 to a remote transceiver such as a block 130 additionally labeled central station. Optionally, the tracking device 112 may include a user interface 132. The user interface 132 may include a keypad, buttons, a touch pad, a joystick, an additional display, or any other device useful for providing an interface between a user and the electronic device 112. While a GPS type device can provide very accurate location data, reasonably accurate location data can also be obtained from triangulation in conjunction with surrounding network communication towers or other installed network transceivers receiving signals from or otherwise in communication with transceiver 120 and may be utilized where necessary or appropriate. With present technology, it has been determined that it is typically more efficient to determine location using triangulation techniques in conjunction with surrounding network towers than obtaining that data from GPS satellites and, accordingly, less battery power is required. Accordingly, even though less accurate, network tower triangulation location is advantageously used in conjunction with this invention.

While in FIG. 1, as illustrated, communication of the tracking device to a central station is shown as being completed through a communication cloud, programmed cloud servers may be used as a central station to be monitored by any appropriate authority having the necessary access codes and passwords. That is to say, any variety of topology ranging from wired connected servers to completely cloud-based systems may be used and comprise part of the teaching of this invention.

The communication cloud 128 may include any type of network that is capable of sending and receiving signals, such as wireless signals. For example, the communication cloud at any specific time may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, or any other like communications systems. More generally, communication cloud 128 may include a Wide Area Network (WAN), a Local Area Network (LAN) and/or a Personal Area Network (PAN). Furthermore, the cloud 128 may include more than one network and may include a plurality of different types of networks. Thus, the cloud may include a plurality of data networks, a plurality of telecommunications networks, a combination of data and telecommunications networks and other like communication systems capable of sending and receiving communication signals. In operation, the electronic device 112 can communicate via the cloud 128 with the central station 130 and with other devices interconnected with the cloud 128.

Figure 2:
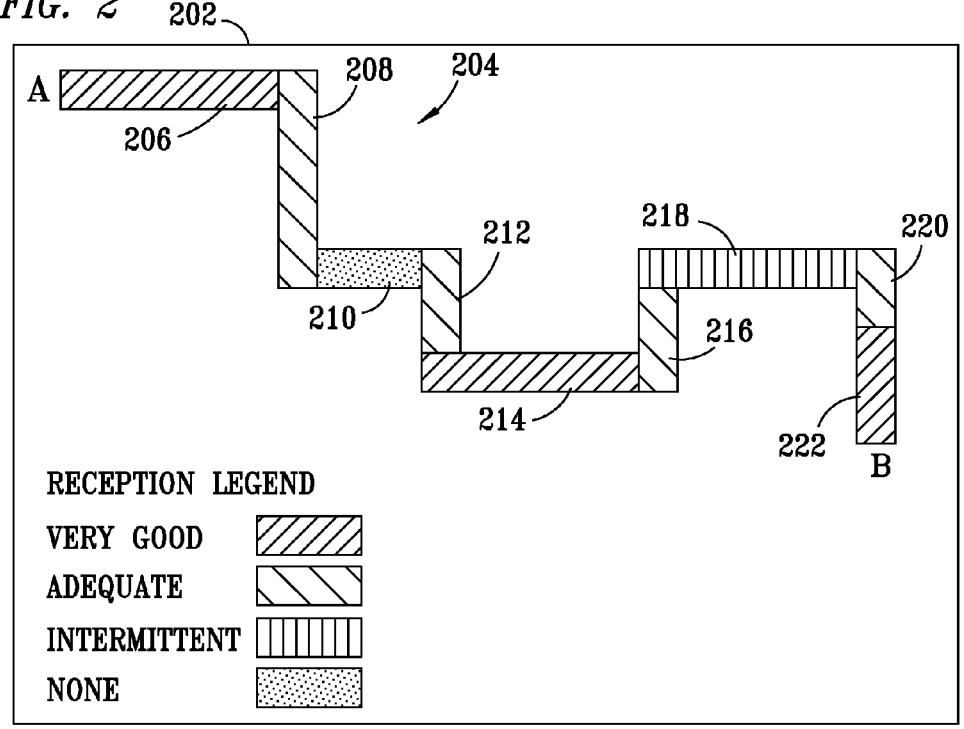
FIG. 2 illustrates one possible transportation route between a starting point A and a destination B that shows the signal strength for receiving signals by a smart device associated with the product in a given container relative nearest wireless communication towers.

In FIG. 2, a map type presentation 202 illustrates a hypothetical route 204 that a transportation container might use while traveling from a starting point A to a destination B. As illustrated, the route has a plurality of segments from 206 to 222 with different shading in various segments representing the relative signal reception obtained from the tracking device that, as presented, is situated within a given container along the route 204 illustrated. In accordance with a reception legend, segments 206, 214 and 222 portray the areas where reception in a given container following this route had a very high quality and is consistently available. The segments labeled 208, 212, 216, and 220 had a somewhat lower quality of reception but a signal was substantially continuously available and was adequate for communication of data. The segment 218 was found to be intermittent in quality for reliable reception and may require considerable repeats of data transmitted before a complete transmission of data would be accomplished. A stretch such as segment 218 might be found in a lightly populated area such as going across a portion of a desert or possibly a mountainous area. A section labeled 210 is illustrated by the lack of shading in the legend as having no reception whatsoever, such as may be found in a tunnel.

Figure 3:
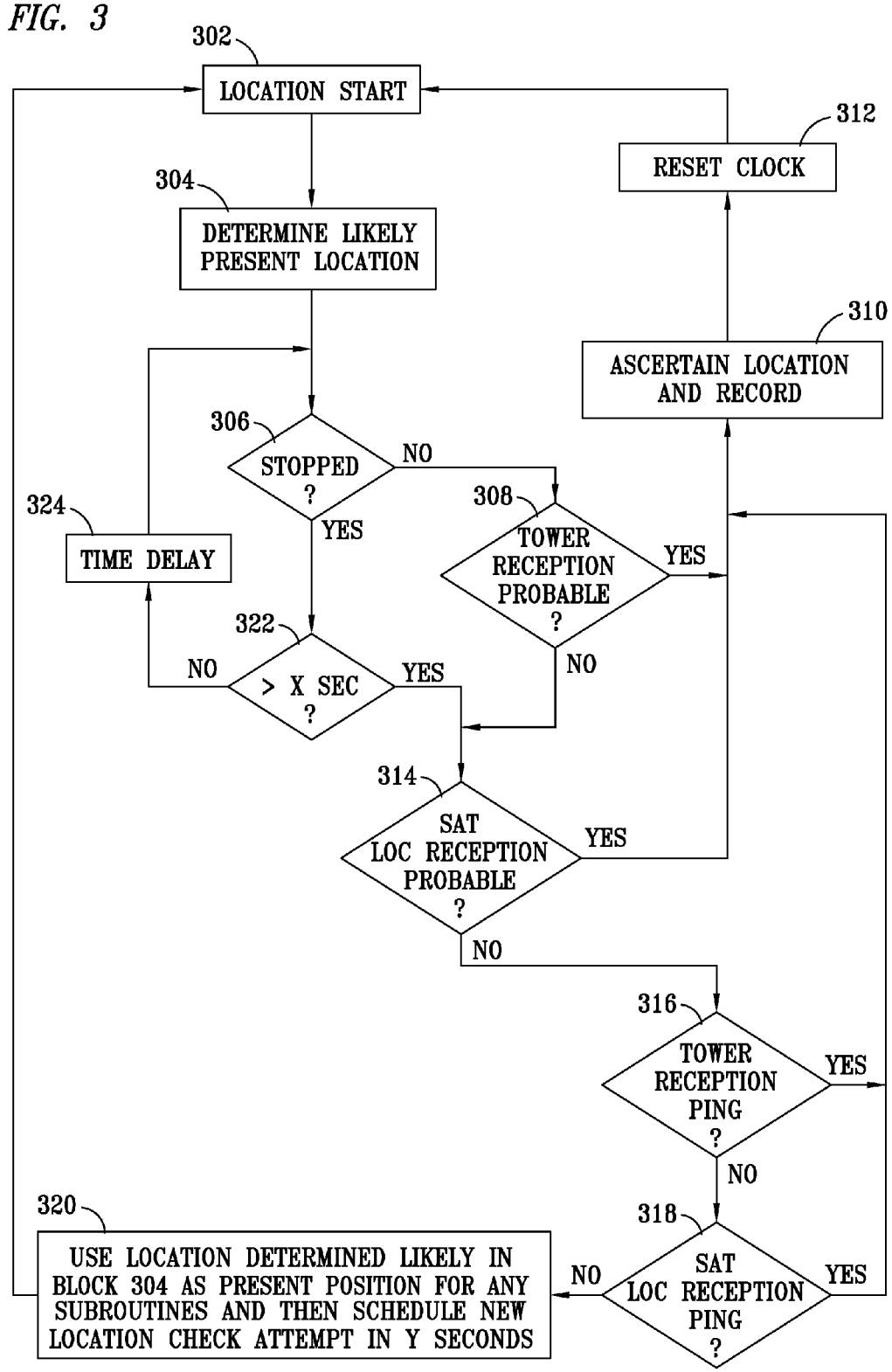
FIG. 3 is a subroutine that may be used in the program of a tracking device for obtaining location data from available location providing means including wireless signal sources such as GPS type satellites and network towers.

When the program in tracking device 112 determines that it is time to check the location, it will actuate a start signal within a block 302 of the FIG. 3 subroutine and proceed to a block 304. It should be noted that the tracking device 112 may determine that it is time to check the location not only from the time of the last check but also in response to other sensed conditions, such as temperature where the cargo is temperature sensitive, shock events that may indicate theft at a time when such shock events should not occur, and so forth. In block 304, the subroutine will access the data within memory 116 for a set of network tower communication data similar to that provided in connection with the map of FIG. 2 as well as data oriented towards obtaining satellite reception for use in triangulation location determination such as accomplished using today's GPS technology. The subroutine of FIG. 3 will also determine the approximate present location along whatever route has been followed as determined by the tracking device. This approximate location can be based somewhat crudely on the typical speed for this section of the highway and the time elapsed since the last GPS location was obtained or by various sensing devices incorporated with the tracking device as expanded upon infra. This approximate location can also be determined by a technique known as "dead reckoning". Such technique need not rely on external wireless signals to perform location estimation and is known and presently used in various navigation devices presently being sold. The subroutine will then proceed to a decision block 306 where it checks with some type of sensor, such as an accelerometer or other similar device, to see whether or not any present movement of tracking device 112 with respect to the Earth is detected. If indications of movement are detected, or in other words it is not stopped, the subroutine will proceed to decision block 308 to see whether, from data obtained in block 304, network tower reception is probable. If it is probable and an initialization routine can be completed for contact with a tower, the subroutine proceeds to block 310 to ascertain present location and record the data obtained. This data includes not only location but also signal strength, number of attempts to contact towers before succeeding and so forth. The location may be obtained directly from the communication network where the network contacted normally retains such information and alternately such data may be determined by the tracking device itself through triangulation algorithms. Once the data is recorded in memory, the subroutine proceeds to block 312 to reset a clock that may be used for periodic location checks and then returns to the start block 302.

Returning back to the tower reception probable decision block 308, if it is determined that tower reception is unlikely, or if an attempt was made to contact towers and was not successful, the subroutine proceeds to a decision block 314 to see if the communication data retrieved in block 304 indicates that satellite GPS reception is probable. If it is determined that it is probable, an attempt is made to obtain location data from satellites. If successful, the subroutine proceeds to block 310 where the appropriate data is recorded, the clock is reset in block 312 and the subroutine returns to start block 302. If, on the other hand, decision block 314 determines the GPS reception is not probable or an attempt was made and was not successful, the subroutine proceeds from decision block 314 to a decision block 316. If, in decision block 306, it was determined that the device was not stopped, and if in decision block 308 it was determined that tower or other network transceiver reception was not probable, and thus no attempt was made to contact a network transceiver in decision block 308 or alternatively it was attempted and failed, the subroutine in decision block 316 will attempt to ping any nearby network towers indicated in the database. This second attempt, where the first attempt has failed, may be successful because of movement of the tracking device or alternatively that the nearest tower may not be as overloaded by communications from other transceivers. If successful in initialization of communication with a tower, the location data will be ascertained and recorded in block 310 and the subroutine will return to its start location as indicated by block 302. On the other hand, if initialization and communication is not successful as a part of reception decision block 316, the process will continue to a decision block 318 to ping location providing satellites, even though the determination in block 304 was that it was improbable, in an attempt to verify or disprove previous data or alternatively to actually succeed in obtaining location from the satellites. If successful in establishing communication with the satellite, the subroutine will again proceed to a block 310 where the data is recorded. If the pinging in decision block 318 is not successful in establishing contact, the program will proceed to a block 320. In block 320, the guesstimated location obtained in block 304 will be used as a present position for any other subroutines and schedule a new location check attempt in Y seconds. It will also record the number of ping attempts that were unsuccessful in attempting to establish communication with network towers by the process initiated in decision blocks 316 and 318, and such data may be retained and forwarded on the next communication attempt to be used by the system to "learn" additional information about the given route. The process will then return to location start block 302.

If, in decision block 306, it is determined that the device is not moving with respect to Earth geographical coordinates, the process will proceed to a decision block 322 where a check will be made to see if the device has been motionless for more than a predetermined number of seconds X. If it has, the process will proceed to decision block 314 and proceed as referenced above. If, on the other hand, the motionless condition has not exceeded X seconds, the process will continue to a time delay block 324 and after a short time delay will return to the input of the decision block 306 to determine if it is again moving or still stopped. This check of time stopped may be utilized to determine temporary stops such as at a stoplight or other stop and go conditions.

The number of attempts to contact a tower or a satellite is an auxiliary indication of potential communication problems for a given recorded location. It is not a direct indication like signal strengths since a tower may be temporarily overworked at a given time of day. However, by recording the number of attempts, a graph or other display may be generated for use in determining areas to avoid if wireless communication while traveling is a prime consideration. Further, the data is useful in determining the likelihood of intermittent communication in given areas.

As mentioned supra, the determination of present position in connection with block 304, sensors in present day tracking devices, using accelerometers, gyroscopes or other sensing devices, can very accurately determine speed of a vehicle throughout a transportation cycle and thus an approximate location can be reasonably accurately determined. Such techniques are known and in some situations termed "dead reckoning" but more crudely are referred to as "guesstimating" location. From the approximate location determined in whatever manner, the device can ascertain whether or not GPS reception is probable or improbable as set forth in various decision blocks such as 308 and 314. A further refinement of the subroutine of FIG. 3 may, if desired, include the likelihood of mountainous areas or "urban canyon" environments where GPS type reception or tower reception might be intermittent, especially while moving, but obtainable with difficulty.

As will be apparent in FIG. 3, when it is determined that the tracking device is moving, and from accessing the database as to likelihood of tower reception as shown in decision block 308 as a first attempted position calculation, the tracking device uses an alternate method of calculating location using satellites. In fact, if neither one of these methods of location calculation is likely to be completed, a further alternate of the dead reckoning is used.

It should be understood that the tracking device can initiate the process detailed in FIG. 3 as a result of any trigger (that is to say, a sensor threshold or other intelligent determination by the device or central station could start the process and it is not limited to a timer or clock based function only). Additionally, the determination in block 322 may well be more complex than a simple timer, and may perhaps be a combination of sensor input, timers, and other various conditions as one might imagine. As will be apparent infra, the actions taken in connection with decision blocks 308, 314 and 316, wherein an attempt is made to complete a communication connection, are similar to actions described in connection with a gap check subroutine of FIG. 5.

As shown in FIG. 3, the tracking device may be designed to use a high accuracy location determining device when no movement is detected. When movement is detected, high accuracy location determining circuitry is inaccurate by an amount which is a function of the speed of whatever means is transporting the tracking device. Thus, preference can advantageously be given to utilizing a lower accuracy location determining means when motion is detected. As shown in FIG. 3, the high accuracy determining approach uses satellite GPS, although preference is given to the location being determined by land-based tower transceivers when motion is detected. When the land-based location method is used, the flow diagram does not even get to the decision block 314 and thus the high accuracy GPS location determining circuitry is not utilized.

Figure 4:
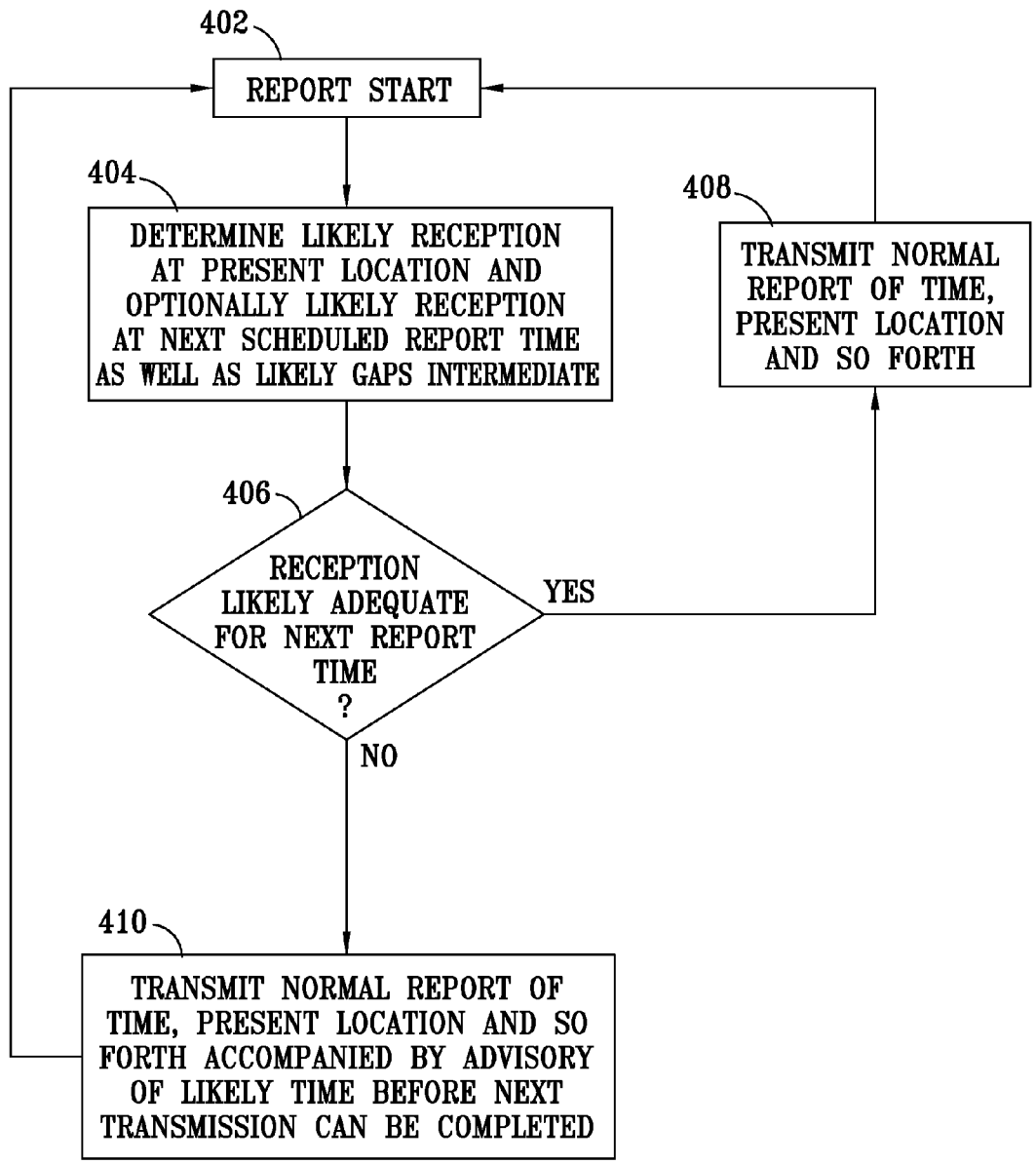
FIG. 4 is a subroutine that may be used in reporting data to a remote receiver such as a central station of data collected since the last report when a determination has been made that it is likely that a report can be satisfactorily completed in a reasonable amount of time.

Referring now to FIG. 4, it may be noted that a start block 402 of this subroutine proceeds to a determination block 404 when the subroutine is actuated in accordance with parameters of the main program. Using techniques similar to that mentioned in conjunction with the location subroutine of FIG. 3, the tracking device 112 is able to reasonably accurately predict the probable location of the next scheduled report time in situations where the product is being transported to a specific destination along a typical and normally used route and assuming there is no breakdown of the transportation container or the drive vehicle becomes unavoidably detained in a traffic slowdown. As will be explained infra, in situations where there is no predetermined route, it may be assumed that the transportation will continue in the present direction for the guesstimated location presented in block 404. Since the report to the central station will typically occur immediately after a location of some type has been obtained by the subroutine of FIG. 3, no further calculations are normally or likely necessary to report the present location. Once the probable location of the next report time is determined, a check of the database in memory 116 (or optionally a database in central station 130) will allow the device to determine whether reception is likely to be adequate at the next reporting location and the likelihood of any gaps intermediate the present location and the next reporting location. As will be apparent to those skilled in the art, if memory 116 is inadequate in size to include all the data for a given transportation distance, the tracking unit memory can be periodically updated during report cycles to a central or other remote station. In such situations, the subroutines of FIGS. 3 and 4 may preferably be executed primarily at the central station. Even where memory 116 has adequate capacity, it may be desirable to communicate, to a tracking unit, information as to upcoming communication gaps, especially those newly discovered or reported by other means, unsecured Wi-Fi locations, traffic problems that may involve detours from an initially scheduled route or delays, and so forth, along with alternative actions that might be taken from normal procedures. The subroutine will then proceed to decision block 406. If, from the database, it appears that the determined likely location of the next scheduled report time would have adequate reception, the subroutine proceeds to block 408 where a normal report of time, present location, number of attempts before communication is obtained, and so forth, is transmitted to the central station and the subroutine returns to the start block 402. If the tracking unit has determined from data in its memory that there is likely to be communication gaps or intermittent communication problems prior to the next report, this information may also be included in the report occurring in block 408. Such information allows the central station to update the tracking unit with most recently obtained data. If, on the other hand, it appears that reception is likely to be inadequate at the next scheduled report time, the subroutine proceeds to block 410. At this time, the normal report is presented including any likely communication problems in a manner similar to that as occurred in connection with block 408 and if the tracking device is being used by a system that is concerned with theft or other various transportation problems, the subroutine can report that it is likely that the next report time may well be bypassed unless instructed to attempt other actions. Alternatively, or in addition, the program may be designed to issue an advisory to accompany the report as to when it is likely that the next location report will be transmitted. When the transmission set forth in block 410 is complete, the subroutine returns to the start block 402. As will be obvious, these subroutines and the various logical determinations may be made in either the tracking device or the central station. If these determinations are made in the central station, instructions may need to periodically be made to the tracking device as to items like expected duration of an oncoming gap, the time of the next report after the gap has been traversed, possible monitored threshold conditions that are at risk of being violated before the next reporting opportunity, and so forth.

It should be noted that the tracking device and/or the central system may utilize a form of artificial intelligence software. As an example, the tracking device may be monitoring certain aspects of the condition of an asset (such as temperature). When a determination that adequate reception is likely to be lost for an extended period of time, the control system and/or device may decide to more deeply analyze appropriately critical data. If, for example, it is determined that it is likely that a communication outage is likely approximately 45 minutes in the future from the present time and that the temperature has been rising at a rate that will trigger a threshold violation significantly before communication is again available, such as in 24 minutes, if the temperature variation continues at the current rate, the device and/or control system may choose to modify typical or normal report procedures and issue a pre-alert or advisory alert. As used herein, a pre-alert or advisory alert is an alert issued prior to a sensed condition reaching a critical value because of some other condition occurring that could prevent an alert from reaching an authorized entity when it is likely that, in view of recent events, the critical value will be reached. As set forth above, an example of "other condition occurring" is a determination that there is likely to be a wireless communication problem when the critical value is probably going to be reached. Such a pre-alert or advisory alert may be utilized to inform an appropriate authority and/or the driver of the transportation vehicle to take some appropriate action, such as taking a detour that would not allow loss of communication or personally checking the temperature in the container or the operational capability of the temperature modifying device.

It should also be noted, the term periodically, as used in this document, may be time based but also, or alternatively, may occur from time to time as a result of preprogrammed instructions, sensor triggered events and/or artificial intelligence capabilities of the tracking device.

As indicated supra, the central station may be provided with the identical database information and have a reasonably good idea of where the tracking device is and where it will be located at various times and if the central station has adequate computation and/or memory capability, the tracking device would not always have to provide the additional information set forth in block 410. This, of course, assumes that the transportation container does not encounter a traffic slowdown or a breakdown of the container ensemble that would prevent further movement. Although it will certainly use more battery power, if the tracking device has limited memory capabilities, the central station may provide data for limited length future segments of the transportation route that the tracking device is able to work from in anticipating when to receive GPS type data and make future reports or utilize previously unanticipated actions.

Figure 5:
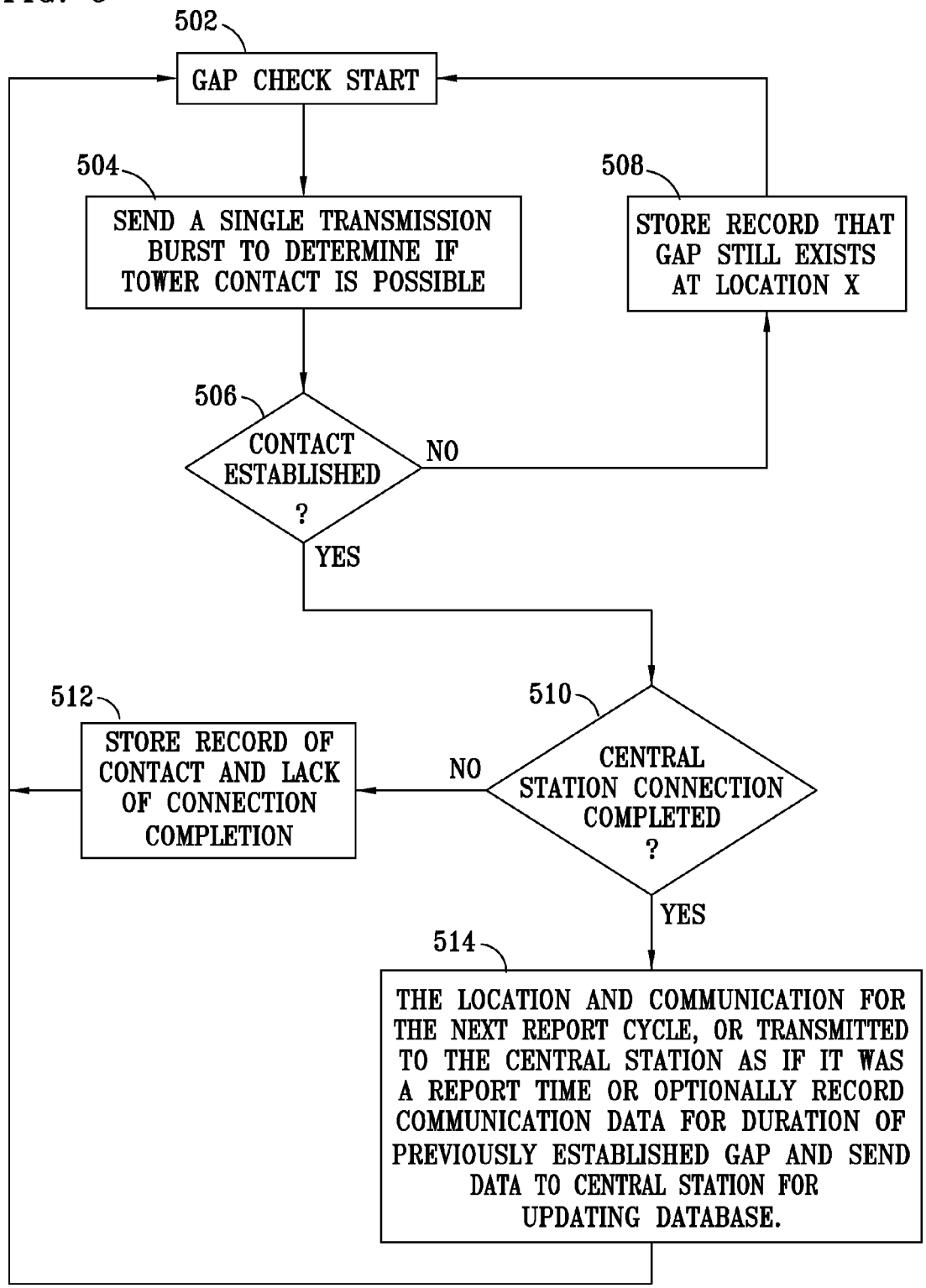
FIG. 5 is a subroutine that may be utilized whenever appropriate to check to see if a communication gap still exists for a portion of a route previously determined to have communication problems.

Referring now to FIG. 5, a subroutine gap check start block is labeled 502. When this subroutine is called, it proceeds to a block 504 wherein a single transmission burst is sent from the tracking device to determine if a network transceiver contact is possible. This is substantially the same situation that occurs when a cell phone type device is first turned ON except that, typically, upon initial turn on, the cell phone will try a multiplicity of transmission bursts until it times out or is otherwise successful in contacting a primary tower for communication. By sending a single transmission burst, the tracking device can instantly tell whether or not it is still in a complete dead zone or whether or there is a possibility of establishing reliable communication. If it is determined in a decision block 506 that there is no present possibility of establishing contact, the program will proceed to a block 508. Within block 508 the wireless tracking device stores data indicating that there was no contact and provides a location. This location determination may be made using GPS, if available, and otherwise using some type of approximate location computation as mentioned supra. This information can be transmitted to the central station as part of the next report. After recording this data, the subroutine returns to the start block 502. If, on the other hand, in decision block 506, it is determined that there are radio signals of the appropriate frequency and strength detected, the tracking device will attempt to complete a connection. If it is determined in decision block 510 that a connection has not been completed with the central station, the process will continue to block 512 where data is stored of the fact that contact with cell phone type transceiver signals was made but that connection difficulties prevented a completion of connection. If, however, the connection is determined to have been completed in decision block 510, the process will continue to block 514. At this time, the wireless tracking device can record in memory the communication data available at that point and complete a communication with the central station whereby the central station is informed that the database for that portion of the route needs updating. The tracking device may consider this as a report time and schedule the next report time accordingly as a function of how users of the system want the reporting cycles to be maintained. As an available option, partly in dependence upon various criteria for the system, battery power available in the tracking device and so forth, the subroutine can either return to block 502, after terminating the communication with the central station, or it can continue recording communication characteristics along with location data for the duration of the portion the route that was previously found to lack reliable communication capability for use in updating the system database.

The system may be designed for one or more tracking devices to utilize the subroutine of FIG. 5 every time that one or more tracking devices pass through a dead zone as previously indicated by the database for dynamic learning. Alternatively, the system may be programmed to have tracking devices only utilize the subroutine of FIG. 5 on certain routes, only when it is suspected that the mobile telephony communication provider has modified their system, only when certain types of products are being transported or on some periodic basis.

The system as initially described above having different recorded sets of data for different containers allows the system to be used from any starting point to any destination along presently mapped routes. When used in this manner, the loading of tracking devices accompanying products in a transportation container may proceed very rapidly. It does, however, assume that there are no products or objects loaded into the transportation container that will significantly interfere with reception of wireless signals to or from the tracking device. If, however, there are any communications concerns, when the transportation container is fully loaded, a test check can be made by the central station to each tracking device within the transportation container and ascertain the signal strength of each device as compared to the previously established normal signal strength at that location for that type of container. The central station may then utilize any noted deviation or aberration from normal in determining whether or not contact may be made with any specific tracking device along the route to the destination of that tracking device in that transportation container. A further step may be taken to notify the entity using the tracking device of such a situation so that corrective actions can be evaluated.

From the above, it will be apparent that a reasonable approximation of wireless communication gaps can be deduced by the central computer with respect to any transportation container having tracking devices enclosed therein by merely checking the signal strength received by the tracking device and/or the signal strength received by nearby network transceivers from the tracking device as compared to previously established signal strengths along a route nearby the location where the transportation container has been loaded. In other words, by adding or subtracting the deviation from the previously established signal strength not only can likely communication gaps be determined, but also the duration of travel of the gaps with reasonable likeliness of accuracy. This approach to determining gaps in wireless communication may be termed "dynamic" as opposed to the container specific determination first set forth, but provides much greater versatility and adequate accuracy in a large majority of cases.

It should be apparent that, by having the central station communicate with all tracking devices scheduled to be contained within a given transportation container before leaving the shipping dock, information as to signal strengths may be used to revise the loading arrangement if communication with a given tracking device that appears to have a low signal strength is critical. Also, in some instances, in part depending on container type, if physical location of each tracking device is also requested by the central station, a determination may be obtained as to whether or not all of the tracking devices intended to be in the transportation container are actually loaded in that transportation container.

As will be realized, communication between a cell phone type device and a communication tower transceiver is dependent on both the strengths of the received signal by the cell phone type device and by the signal strength received by the transceiver from the cell phone type device. Thus, communication gaps and/or the length of time a communication gap continues may be due to the strength (or lack of received signal strength) of the signal transmitted from the cell phone type device to any receiving nearby communication transceivers as well as the strength of the signal received by the cell phone type device as shown by a set of bars on many cell phones. The low received signal strength at the nearby communication transceivers may be due to faulty circuitry in the cell phone type signal transmitter in the tracking device or it may be due to placement of the device in a container with other products including signal shielding metal that prevent the transmitted signal from exiting the container at the normally obtained signal strength. As is known, there is a capability in at least some types of wireless communication systems whereby the signal is received at a network transceiver from a cell phone type device and, as part of the interaction between a given cell phone type device and the network transceiver, the power transmitted by the cell phone is adjusted, in accordance with commands returned by the network transceiver to the cell phone type device, in an attempt to prevent crosstalk between signals from that cell phone type device and the many other messages that the antenna of the network transceiver is receiving from other similar devices. This adjustment is designed so that the cell phone or other mobile wireless communication device is transmitting minimum power when near a communication tower and maximum when it is far away.

To more accurately predict when communication gaps are most likely to occur, it is desirable, when using the present invention, for the user to have some type of indication of signal strength presently being received by nearby network transceivers after the container is fully loaded with products to be transported, as well as signal strength received by the tracking device from any nearby network transceivers, as compared to the signal strength obtained in preparing databases of signal characteristics for the present transportation event from start to finish. As referred to supra, when these two signal strengths, as received by the network transceiver and as received by the tracking device, are known, this data can be used as part of a calibration technique to adjust values retrieved from a database that exists for a given route and adjust or otherwise modify these values in accordance with the calibration measurements obtained for either a different container or for an unusual packing situation of a normally used container that produces a significant modification of transmission and reception characteristics for the tracking device in that container. It will thus be apparent to one skilled in the art that a combination of the device perspective and the wireless network perspective may be used to very accurately analyze the situation, or alternatively one can use the device only or the network only perspective to practice the invention with only minimal degradation in accuracy.

The signal strength indication of a given situation may be reasonably deduced by presently available portable meter instruments which can measure signal strength of a given transmitted signal emitted from a container by a specific tracking device in comparison to previous signal strength measurements that have been correlated with a nearby communication tower or other network transceiver data. As part of quality of service measurements by communication network transceivers, signal strength from a given cell phone type transmitting device is one of the characteristics measured. This measurement is made for many reasons including at least that when the cell phone communication system notes that signal strength is degrading as received from a particular cell phone type device, the network transceiver can instruct the cell phone type device to increase the output power as mentioned above, or alternatively the communication system can arrange to have another communication tower network transceiver that is noting a rise in signal strength from that cell phone type device take over receiving and relaying the signal to a given destination. Thus, it is also possible to make arrangements with the wireless signal supplier (or suppliers) along a given transportation route to obtain signal strength measurements for use in helping determine why communication at various locations along a route are nonexistent or intermittent. Any of the above arrangements may be used in providing more accuracy in determining when communication problems are most likely to occur and the duration thereof by adjusting the previously obtained database supplied values. In other words, if it is determined that the tracking device is positioned such in the container that the signal received by the network transceiver is of greater power or if it is otherwise determined that the tracking device has been commanded to reduce its power and if likewise the signal received by the tracking device from the network transceiver is higher, it would be less likely that a given area would have intermittent communication. In similar manner, if a given gap in communication were merely due to distance from nearby network transceivers and not to environmental obstructions such as tunnels, a mountain and so forth, it is likely that the gap in communication would be shorter in duration than occurred in connection with setting up the database originally. Since communication network transceiver antenna location data is readily available to a system controlling computer, the reason for the gap will normally be discernible from available data when that determination is deemed appropriate. However, a distance gap is typically discernible by noting the gradual degradation of received strength that occurs from distance as opposed to the relatively sudden degradation of received signal strength that usually occurs due to an environmental obstruction. Computer software may thus determine, through such an analysis as described above, whether the tracking device is operating in a substantially normal manner or whether its communications capabilities have been degraded due to an obstruction. Such information is of value for predictive purposes when making determinations of likelihood of communication gaps.

It should be noted that while saving of battery power has been, to some extent, emphasized above, there are many additional reasons for being able to predict communication gaps or intermittent service. Entities that request tracking service for very valuable merchandise may want to have local authorities notified if the gap or other communication problem area coincides with an area where similar containers have been hijacked by thieves. In a similar manner, local authorities may need to be notified that a container of hazardous material is passing through an area that cannot be monitored due to communication problem areas and that the local authorities should be aware of the situation. By being able to predict communication gaps or problem areas, the operator of the transportation container may be notified prior to a communication gap that the gap is expected at a given future mileage indicator or other known positions in the route being traveled and the operator may be instructed to use some other form of communication for a given distance, such as CB radio. Depending upon prior data available to the central unit or the tracking device, the operator of a transportation vehicle may be instructed to report in at given times because the prior data illustrates it's a high-security risk or merely to report if there is a problem within the area designated by the system if it is determined from data obtained from legal enforcement entities or from previously obtained system data that there is substantially no likelihood of problems within the area of the communication gap. Also, by knowing with high probability where communication problems or gaps occur for a given transportation mode and container, an entity requesting high-security tracking, when advised that there is an alternate route available that may be slower or longer but has no communication gaps, may choose the alternate route, especially where the user has already chosen to have continuous communication rather than periodic reporting whereby the tracking unit can monitor and report some aspect of the environment with respect to the product being tracked.

The central unit may also have access to databases providing information relative reported traffic incidents, road construction and repairs and weather conditions. Such additional data may be used by the central unit in determining the length of time that a container is likely to stay within the zone where reliable communication is nonexistent or at least unlikely or intermittent. Such additional information is useful in predicting the timeframe of communication problems by either the central unit or the tracking device along with present speed of the container and the likelihood that that speed is likely to continue or vary based on previously obtained data. Either the tracking device or the central unit may include the capability of notifying an authority such as an entity responsible for initiating the tracking service that the device is about to enter a zone with a history of unreliable communication including the time that the device is likely to remain in that zone whereby that entity can take whatever steps are deemed appropriate by that entity for the time that the device is in the specified zone. In a similar manner, the tracking device may automatically notify appropriate legal authorities of the situation whereby the legal authorities can take any appropriate steps they may feel are necessary to monitor the situation. Such notification would be especially important when the container includes hazardous materials.

Although thus far this invention has been primarily described in conjunction with a tracking device internal to a transportation container, many of the concepts presented will apply equally well to any tracking (including navigation) device on a vehicle such as are used in the trucking industry on the cabs as well as by many corporate fleet operations to keep track of every vehicle in a fleet. Thus with a database of the type mentioned above, operators of fleet vehicles may be notified directly by the tracking device or by a central station that an upcoming data gap is likely to occur at a given point in travel and that, if in a high crime area, they need to be more alert or that they need to use another form of communication if there are problems. Further, the central station would be aware that if the vehicle continued in the same direction, there should be a communication again at a reasonably predictable time and, if no communication occurred, then an alert would be issued. It should be noted that, in response to a determination that there is an extended upcoming communication gap, the tracking device may be instructed to, or on its own initiative may, alter various monitored thresholds, sensor sampling intervals, or feedback mechanisms. As an example, the device may sample particular sensors, such as door/breach sensors, more rapidly in an effort to more closely monitor the situation during such coverage gaps or the device may revert to high decibel alarms or other countermeasures as the primary response to unauthorized access detection, or other distress notification methodology, when the device knows that it can't send wide area communications.

Figure 6:
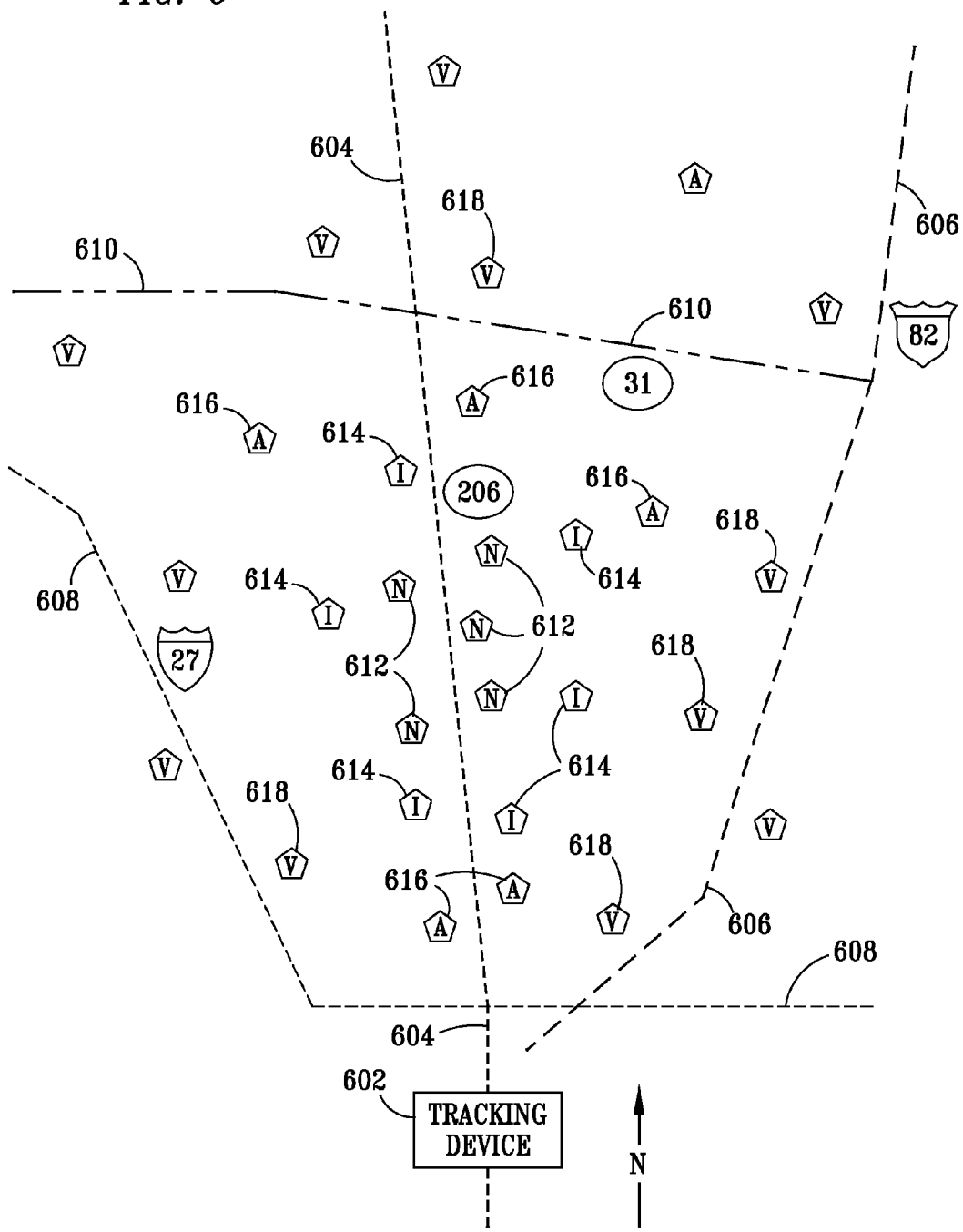
FIG. 6 is illustrative of a display that might be presented on a navigation or other device utilizing the concepts of this invention.

While the present invention was originally designed for use in conjunction with tracking devices attached to products being delivered to destinations along established routes of transportation, the communication gap alert capability is readily adaptable to any wireless navigation or tracking device whether used in sports, navigation, hiking, or other recreational activities. In FIG. 6, a block 602 represents the present position of a tracking device on the display of a navigation or tracking device carried by an individual that is presently heading in a northerly direction toward an unknown destination. This display is similar to that provided on present day navigation devices for cars. Thus, the display of the tracking device 602 may display all of the components shown in FIG. 6. At present, it may be assumed that the individual is traversing a state highway 206 additionally labeled 604. As illustrated, in addition to state highway 206, there is a US highway 82 additionally labeled as 606, an interstate freeway 27 additionally labeled as 608 and a further state highway 31 additionally labeled as 610. In addition, there are a plurality of pentagon shapes with the letter N illustrated within and labeled 612 on both sides of highway 604 to the north of the present position of tracking device 602. The shapes 612 represent geographical locations on the display that have been previously found to have no wireless communication capability. In the area around the shapes 612 are a plurality of further pentagon shapes 614 having the letter I contained therein which represent locations where wireless communication is intermittent. Elsewhere on the display, there are a plurality of pentagon shapes having the letter A contained therein representing areas or locations where it has been determined that adequate wireless reception has been found. Some of the pentagon shapes containing the letter A are designated as 616. Finally, there are a plurality of pentagon shapes including the letter V representing locations where very good wireless reception has been reported. Some of these pentagon shapes including the letter V are designated as 618.

The user of the tracking device 602 can quickly determine that, if the user continues in the same direction as present, the user will soon enter an area where no wireless communication will be available. However, by deterring either to the left or to the right, there are many locations reported as having very good wireless communication capability. Thus, if the user is traveling in a vehicle, the user could take US highway 82 labeled 606 to where it intersects with state highway 31 labeled 610 to return to an upper portion of a highway 604. If the user of tracking device 602 is hiking, walking or running, the user can still deviate slightly from the original northerly route to either the left or right and maintain the wireless connection.

While the types of wireless connection signal strength are shown using four alphabetical designations at various geographical locations, additional levels of signal strength or communication capability may be added where appropriate and may be shown by various types of shading, such as shown in FIG. 2, or by numerical designations such as from 0 to 9. On the other hand, the complexity of the drawing could be considerably reduced in many applications of the invention by only showing the locations of no communication and/or intermittent communication. Alternatively, such information could be displayed using various colors and intensities to provide a heat map type of visualization that shows areas of intermittent coverage in faded colors and areas of very good or nonexistent coverage in dark rich colors, with the colors coordinated with the type of coverage present (i.e., very good as green, nonexistent as red, intermittent as faded yellow, etc.).

Figure 7:
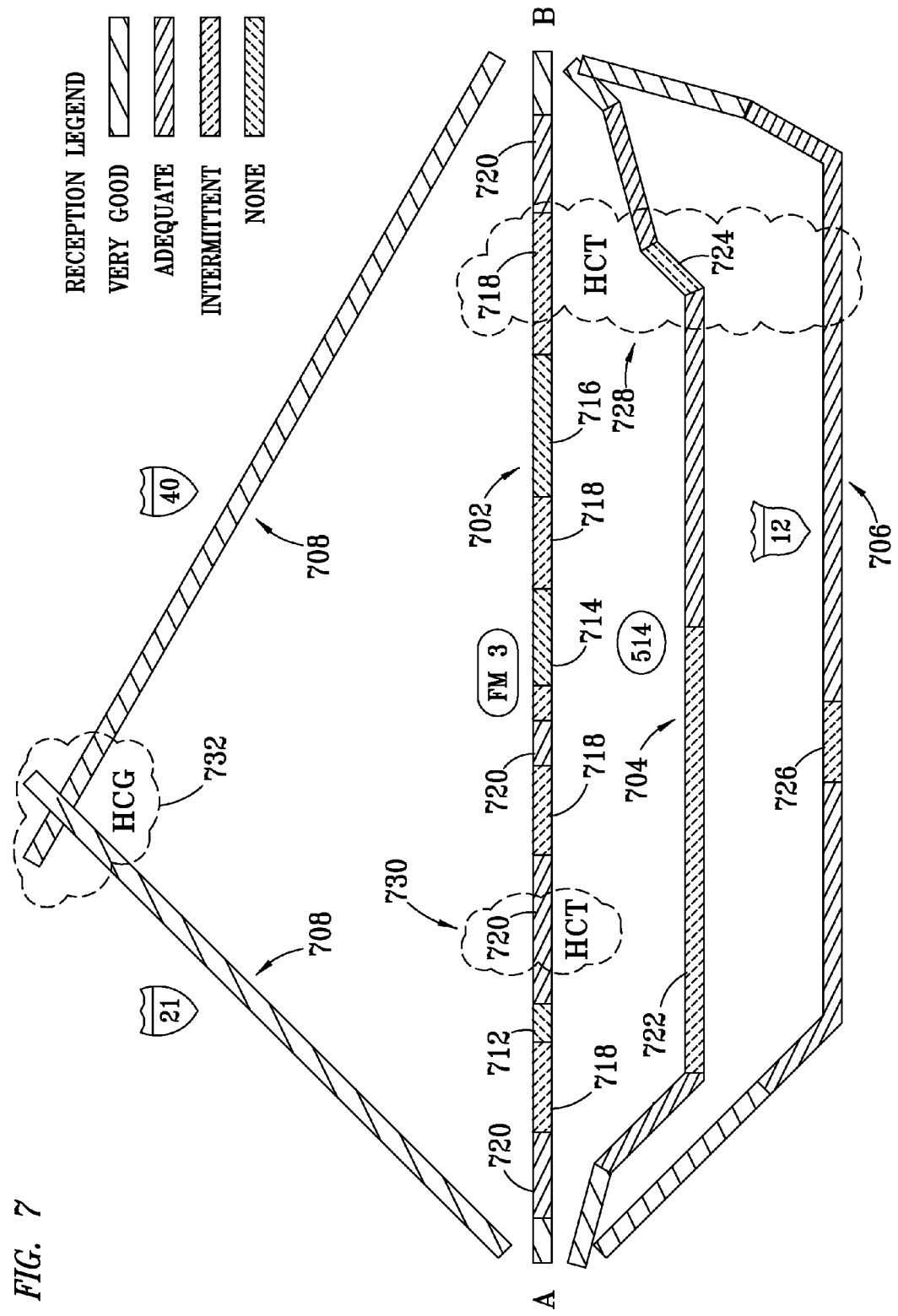
FIG. 7 is illustrative of a display presented by the system when ranking potential safety of transportation as a function of communication.

As mentioned supra, FIG. 7 is a rudimentary illustration of potential routes that might be taken in transporting products between points A and B. One route is illustrated as a direct line on a country or farm to market road designated as FM 3 as well as a designation of route 702. A slightly longer route is designated as a state highway route 514 and is given an additional designation of 704. A slightly longer route yet is given a designation of US highway 12 along with a further designation of 706. Finally, a route could be taken first using an interstate highway designated as 21 and provided with an additional designation of 708 from the origin point A to where it intersects with an interstate highway labeled 40 as well as the previous route designation of 708. As shown in a reception legend, using the same representations of reliable wireless communication as shown in FIG. 2, the route 708 using the two interstate highways has very good communication reception the entire distance as is typical with interstate highways. The farm to market road 702, as shown, has several areas 712, 714 and 716 where there is no wireless communication according to documented records. Further, there are a plurality of areas or locations along route 702 that have been found to have intermittent communication during various checks of communication along this route. Each of these areas on route 702 is designated as 718. A few areas on route 702 have a designation of 720 indicative of adequate reception when last checked. The only good or very good communication occurred at both ends of the route 702. As may be observed, the slightly longer state highway route designated as 704 does contain a fairly long portion of the route 722 of intermittent communication and a shorter stretch 724 with no reception. As presented, route 706, illustrated as being along a US highway 12, shows only a short stretch 726 as having been determined in the recent past as having intermittent reception, with adequate or very good reception throughout the rest of the transportation path 706 between points A and B. There are additional dashed line cloudlike symbols in this figure that are labeled HCT & HCG to indicate high crime areas. A first one is designated as 728 and covers a sparsely populated area and covers portions of each of the routes 702, 704 and 706. More specifically, it covers an intermittent reception portion 718 of route 702 as well as the no reception portion 724 of route 704. In addition, it covers a portion of the adequate reception section of route 706. For the purposes of this discussion, this cloud and another cloud 730 to be discussed in connection with route 702 represent areas where transportation vehicles have often been targeted for theft of products from the vehicles and a significant number have even been the result of forced stops on the highway. The cloud 730 includes a portion of route 702 having adequate wireless reception in all instances of previous checks as indicated in the database of the central computer or central station of FIG. 1. A further cloud 732 at the intersection of interstate highways 21 and 40 also represents a high crime area as is often the case at the intersection of interstate highways but with minimal transportation vehicle thefts being limited primarily to vehicles parked overnight at motels.

While the map or presentation of FIG. 7 is somewhat elementary for purposes of explanation, it is representative of what the present system can generate from collected material obtained from both communication related and crime statistics. The high crime statistics may be obtained from law enforcement agencies as well as material collected from clients using the system. As may be observed, the shortest and most direct route 702 along farm to market road 3 includes several sections that have no wireless communication capability along with the area 718 with intermittent capability and located in an area known to have high crime problems involving transportation vehicles. The second shortest route along state highway 514 further designated as 704 includes a section 724 of no communication right in the middle of a high crime area wherein there are many reported instances of transportation vehicles being stopped and hijacked. The route 706 along the US highway 12, as illustrated, is shorter than the route 708 using the two interstates 21 and 40, but also passes through high crime area 728. While there is a section 726 that has intermittent reception, the section of route 706 passing through the high crime area has always, at least recently, provided adequate reception of wireless signals. Presented with this display, an entity wishing to transport high-value items may well decide that it is completely undesirable to attempt either routes 702 or 704 and make the decision on the difference in total distance between using the two interstates as opposed to the US highway 706 since the portion that runs through a high crime rate area has adequate communication capabilities and if using the tracking components of the present invention, legal authorities could potentially arrive in time to foil any hijackers of the transportation vehicle. A table may be readily generated containing the length of travel for each of the routes displayed in FIG. 7. Such a table is not displayed since it is well within the capability of anyone skilled in the art of computer programming.

Using the data that was accessed to provide the display of FIG. 7, a ranking table may quickly be generated ranking each of the routes being considered using risk factors such as set forth in the table I below. The values of the risk factor designations utilized will vary with location, time and experience but for the purpose of this disclosure will be assumed to be as shown below. As will be obvious, the longer the distance to a given destination, the more risk there is that something will happen whether it is theft or an accident in which the transportation vehicle is involved. Thus in determining a risk factor ranking, number of miles over the minimum possible is a consideration. In the risk assessment as presented herein, the minimum mileage is the straight line distance between the beginning of the trip and the destination. Seldom is there a transportation route that provides a direct minimum mileage connection although such a route is shown as route 702 in FIG. 7. Thus each of the other routes illustrated would have a deduction of 0.1 for each mile in excess of the assumed 400 mile distance between points A and B. Since the tracking device requires some type of communication capability to report problems to law enforcement or to the central computer, there is significant risk for each mile traveled with no reception.

As shown in the risk factor table I for the area under consideration, the risk factor is increased by 0.9 for each mile traveled wherein it has been determined there is no reception of communication signals. The risk factor for intermittent reception is less but still considered to be 0.5 per mile while there is no additional assumed risk factor for adequate or very good reception. For the number of miles that a transportation vehicle has to traverse a route where there is no reception and the portion of the route involved has been determined to have a high crime area with a significant number of transportation vehicles being involved in the crimes, the risk factor is considered to be increased by 2.8 while it is increased by 1.6 for intermittent reception and only 0.4 where the reception is adequate or very good since the wireless tracking device with sensors can report aberrations sensed, such as doors opening at a location where they should not have been opened, as well as other events such as vibrations or shocks consistent with unloading products from the vehicle. Thus the situation can be reported to the central computer and/or to nearby law enforcement agencies. In areas where there is high crime but no significant problems concerning transportation vehicles, such as the HCG area 732 in FIG. 7, the risk factor, while still significant, is determined to be only 1.9 per mile where there is no reception, 0.9 wherein there is intermittent reception and only 0.1 where there is adequate or very good reception.

TABLE I

| Risk Factor | |
|---|---|
| Type Area | Deduc |
| Miles over minimum | 0.1 |
| No reception | 0.9 |
| Intermittent reception | 0.5 |
| HCT no reception | 2.8 |
| HCT intermittent | 1.6 |
| HCT A or VG | 0.4 |
| HCG no reception | 1.9 |
| HCG intermittent | 0.9 |
| HCG A or VG | 0.1 |

As approximately shown in the illustration of FIG. 7, the route 702, with the indicated minimum 400 miles, has 137 miles of no reception according to the database, 182 miles of intermittent reception, 45 miles of HCT intermittent reception, and 11 miles of HCT involvement with average or very good communication reception. When each of these miles is multiplied times the deduction value shown in the risk factor table I, and each of these products added together to form a total, the risk factor that would be projected would be 290.7. For route 704, the information from the database would indicate that the total distance traveled would be 503 miles, so 103 would be multiplied times 0.1 and the remaining values of 45 miles of no reception, 206 miles of intermittent reception, 40 miles of HCT no reception, and 38 miles of HCT adequate to very good reception as multiplied by the appropriate values in the risk factor table I would provide a total risk factor of 281. The route along US highway 12 or route 706 is 617 miles or 217 miles over the minimum. This value, combined with the recorded 40 miles of intermittent reception and 52 miles of HCT adequate and very good reception, would indicate a risk factor of only 62.5. The final route using the two interstate routes of route 708 would utilize the extra 331 miles along with the 102 miles of that being in the HCG area of average and very good wireless reception area for a risk factor of 43.3. In summary, as set forth in the risk factor table II, the risk factors for routes 702, 704, 706, and the final route 708 are respectively 290.7, 281, 62.5, and 43.3. According to the analysis generated by the computer, either route 706 or the interstate route would be significantly safer than the two shortest routes.

The traffic manager for the entity requesting the transportation may then make an informed decision as to which route to take utilizing only the projected risk factors or may be provided with the additional information as presented in FIG. 7 as to types of crimes committed on each of the routes.

TABLE II

| Risk Factor | |
|---|---|
| 702 | 290.7 |
| 704 | 281 |
| 706 | 62.5 |
| 708 | 43.3 |

As may be determined, if the communication network were to alter the location of their transceivers so that section 724 of route 704 was transformed from no reception to intermittent reception, the risk factor would be reduced to 223, and if section 724 was transformed to adequate or very good reception, the risk factor would drop further to 124.9. Thus the information generated by the system could well be used by a transportation entity having access to this data to convince the communication network to improve reception in this portion of route 704.

Similar alterations in the risk factor results may be quickly determined from the computation unit accessing the database for other changes, such as crime and communication statistics, in the available transportation routes.

As mentioned supra, when a tracking device is about to enter an area of unreliable or no communication capabilities, the tracing device may advantageously modify its operation to sense various conditions more often and may include making attempts at determining location and or reports to the central station even though information in the database indicates that such actions are unlikely to be successful. Further, when the tracking device determines it is in an area of unreliable communication, it may additionally use an audible alert for a sensed breach of the container rather than merely reporting a sensed condition that it may be programmed to do when it's in an area of adequate or very good communication capabilities.

As outlined above, the system can provide a ranking of the various routes as a function of risk factor as shown in table II. However, the system is much more versatile than that and can provide a ranking by cost taking into account fuel used for the extra mileage and wear and tear on the transportation vehicle as well as potentially different communication costs depending upon costs attributable to network providers along the route as well as other items like potential overtime wage costs where applicable. Additionally, the ranking may be by communication type available or, in other words, CDMA versus GSM versus Wi-Fi and so forth. The ranking may also be by data speed both presently available, such as 2G, 3G, 4G, and so forth, as well as various nomenclatures of data speed in the future. Although not set forth in the example above, the risk factor may be more specifically detailed to include speed limits as well as typical speeds for given hours of the day and days of the week since time in a communication gap is normally not as much of a problem at 70 miles an hour as it is at 20 miles an hour. Additionally, time of day for transportation may be included in the ranking as night transportation is invariably more risky from a crime standpoint than is daylight transportation. The computer system may also, if desired, include, in the ranking, the pollution load to the environment in taking a longer route versus a shorter route. Thus the ranking illustrated above, while elementary in presentation, is merely illustrative of the capability of the system at presenting rankings using any combination of factors as set forth above and other criteria not specifically set forth.

Since the system database includes signal characteristics of network signals available and usable along any of the routes under consideration, and, since as mentioned above, the ranking can include communication types available, a ranking may be provided as to which communication network provider has the most reliable communication for any given route. This information may be purchased by network communication providers whereby network sponsored advertising messages may be included in the data provided a customer as to how a given network signal provider is superior and should be utilized in preference to other potential network providers available for that route or other routes.

In summary, to practice the present invention, the communication characteristics are obtained at a plurality of locations of interest. Since the difference in signal strength inside as well as outside a given container can easily be determined, an adjustment, negative or positive, can quickly be made in any calculation utilized to determine the likelihood of communication in an area with low signal strength as long as it is known whether a given set of communication characteristics was obtained at a point inside or outside a container. Since signal strength characteristics made by communication companies are typically made in open spaces, these signal strength values and likelihood of maintaining communication would be reduced by an appropriate amount in determining whether or not communication could be maintained by a tracking device within a container. On the other hand, measurements of signal strength made within a container at a given location would be modified upwardly when used in connection with a recreation type tracking device typically used in the open.

As will be apparent to those skilled in the art, the communication signal strength and quality detection of recording instruments need to have an antenna of similar construction to whatever tracking device is to be used with the invention although in many cases the tracking device itself can be used rather than a substitute for communication signal strength detection within the container. In actuality, the database can be prepared over time from using data actually obtained from smart wireless tracking devices themselves that have not had the programming subroutines such as shown in FIGS. 3 and 4. Preferably these characteristics are obtained over a period of time using multiple passages along appropriate routes such as shown in FIG. 2. Preferably the multiple passages will be made with different loading characteristics since other packages and placements of the tracking device will to some extent affect communication characteristics. The ultimately used characteristics may then be made using either an average of all those obtained, the average of all those obtained for certain days, the average of those specifically used at certain times of the day or even the worst communication characteristics for a given location on any portion of the transportation route. A multitude of analysis methods can be used with the current invention, and the specific disclosures defined should not be considered limitations of the possible analysis techniques that can be used beneficially with this invention.

Various characteristics of the installations can be utilized to inform users of "best practices". As an example, it may be determined that specific orientations of the device, regardless of packing or location in the container, are better predictors of signal strength issues. The characteristics used depend on what amount of detail a customer using the tracking device requires to provide any designated protection for a product associated with the tracking device. The set of characteristics chosen are inserted in a database that may be accessed by the wireless tracking device 112 and preferably are contained in memory storage of the tracking device. However, as mentioned above, the characteristics and the database may alternately be stored and maintained in a central computer and data communicated to the tracking device as necessary and/or appropriate. The communication characteristics should preferably be both location indicative satellite reception and whatever land-based mobile wireless communication network transceiver data communication is to be used by the wireless tracking device. The wireless tracking device, or the central unit, will typically be set up for obtaining location data at set intervals and will typically report accumulated data to a remote central station at predetermined time intervals. When the tracking device contains additional sensors for monitoring, for example, the status of a product associated with the tracking device reports may be provided to the central station intermediate the normal predetermined time intervals of reporting. Typically the tracking device will then alter its next reporting time to the predetermined time interval typically used unless the tracking software determines that communication problems, that are likely to affect battery life or safety of the product being tracked, will occur at roughly the time that the tracking device is next scheduled to report to the central station. When such a communication problem is ascertained, the next report may, as an alternate action to be taken in areas of unreliable communication, be scheduled sooner or later than the predetermined time interval typically used. The same scenario applies to obtaining location information from any GPS type satellites.

The data collected in the above mentioned one or more databases relative the signal characteristics obtained along a transportation route will, on many routes, include data from various wireless network providers such as AT&T, Verizon, Sprint, and T Mobile, as well as data on speeds of transportation at various locations on the route and times of day the speed was obtained and so forth as mentioned supra. Thus maps similar to that shown in FIG. 7 can be generated that are network provider specific. Alternatively, the database information can be analyzed to compare various metrics including signal characteristics along a given route for two or more wireless network providers. Advertising material may then be generated illustrating why a given wireless network provider may provide superior wireless coverage as compared to one or more other wireless network providers for a given transportation route. Such advertising material may then be directed to appropriate personnel of companies using the one or more transportation routes for attempting to convince a company that it should use that network provider since the network provides superior wireless performance and, accordingly, communication safety of not only tracking devices but any other wireless devices that might be used by personnel on that transportation route. The advertising solicitation, in appropriate circumstances, may include incentives or wireless service subscription inducements such as coupons, discounts or additional services not directly related to a wireless service subscription.

The present invention includes the expectation that future solicitation of wireless service may be timeframe and/or location specific. In other words, information may be available that a wireless customer, whether or not any present customer of a given wireless service provider, will be at a location, be traveling a given transportation route or will have wireless communication equipment at a given location or traveling some specific transportation route, wherein a given wireless service provider may have either superior service in one or more respects or the only service available. Thus, an analysis of such wireless service at that location along with a quotation of service for a given time period may well be adequate incentive for that customer to accept the service quoted and potentially be a customer for wireless service, with the wireless service provider presenting the quotation, beyond the specified time.

The metrics involved in the comparison may be singular or multiple. However, they would be likely to include at least one of the following signal characteristics or other items pertinent to reliable transportation relative at least in part to adequate wireless communication reliability: (1) number of unreliable communication gaps in a route, (2) total distance of unreliable communication in a route, (3) average signal strength of a route, (4) type of carrier providing network signals along the route, (5) average speed maintainable along the route, (6) proximity of specified services along a route, (7) type of wireless service connectivity speed available along the route, (8) cost of wireless service available along the route, (9) compatibility of wireless service with certain commercially available mobile devices along the route, (10) location of specified services along a route, (11) criminal history affecting transportation at locations along a route, (12) severity of crime rates in areas through which the route passes, (13) types of crimes committed in areas through which the route passes, and (14) types of communication problems. A more advanced advertising presentation may include determining all the specific stops typically made by a specific entity, such as UPS® or FedEx®, and determining or devising, in a manner similar to that used in connection with FIG. 7, a route which might be longer than one presently used by the entity but which has superior communication reliability than the one presently used. Such a presentation is likely to make a significant impression on a potential customer that is concerned about communication reliability, especially a customer providing transportation of products whereby clients of that transportation entity may continuously be kept informed of location of a product being transported.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. Location determining apparatus comprising:
preferred location determining circuitry;
alternate location determining circuitry;
movement sensing circuitry operable to detect presently occurring movement; and
selection circuitry operating to initiate operation of said preferred location determining circuitry while presently occurring movement of said location determining apparatus is detected and to alternately initiate operation of said alternate location determining circuitry when it is detected that presently occurring movement of said location determining apparatus is not occurring.

2. Apparatus as claimed in claim 1 wherein said alternate location determining circuitry is activated only after lack of detection of presently occurring movement exceeds a predetermined time.

3. Apparatus as claimed in claim 1 wherein said alternate location determining circuitry provides higher accuracy in determining location than does the preferred location determining circuitry.

4. Apparatus as claimed in claim 1 wherein said selection circuitry operates to detect when said movement sensing circuitry indicates present movement.

5. A method of obtaining location data via an electronic device while proceeding to a destination:
detecting whether or not said electronic device is presently moving with respect to a geographical location;
using a first determination of location method while movement of said electronic device is sensed; and
using a second determination of location method when no movement of said electronic device is sensed, said first determination of location method having a lower accuracy of location determination than said second determination of location method.

6. The method of claim 5 wherein:
said first determination of location method is a substantially ground-based determination of location that comprises triangulation of signals interchanged with nearby network transceivers;
said presently occurring movement sensing circuitry includes a motion sensor; and
said second determination of location method is a satellite based determination of location.

7. The method of claim 5 wherein:
said first determination of location method is communication network-based determination of location that comprises triangulation;
said presently occurring movement sensing circuitry includes a motion sensor; and
said second determination of location method is present movement sensed based determination of location.

* * * * *